United States Patent
Bons et al.

(10) Patent No.: US 7,614,079 B2
(45) Date of Patent: Nov. 3, 2009

(54) METHOD AND DEVICE FOR TRANSMISSION OF ENTITLEMENT MANAGEMENT MESSAGES

(75) Inventors: Pascal Bons, Guyancourt (FR); Bernard Hamou, Soisy Sous Montmorency (FR)

(73) Assignee: Viaccess, Paris (FR)

(*) Notice: Subject to any disclaimer, the term of this patent is extended or adjusted under 35 U.S.C. 154(b) by 852 days.

(21) Appl. No.: 10/502,536

(22) PCT Filed: Jan. 28, 2003

(86) PCT No.: PCT/FR03/00260

§ 371 (c)(1),
(2), (4) Date: Jan. 31, 2005

(87) PCT Pub. No.: WO03/065650

PCT Pub. Date: Aug. 7, 2003

(65) Prior Publication Data

US 2005/0120197 A1    Jun. 2, 2005

(30) Foreign Application Priority Data

Jan. 31, 2002   (FR)   ................................. 02 01146

(51) Int. Cl.
   *H04L 29/06*   (2006.01)
(52) U.S. Cl. .............................. 726/2; 726/26; 726/27; 713/150
(58) Field of Classification Search .................. 713/150; 726/26, 2, 27
See application file for complete search history.

(56) References Cited

U.S. PATENT DOCUMENTS 5,521,979 A * 5/1996 Deiss .......................... 380/212

(Continued)

FOREIGN PATENT DOCUMENTS

EP      0 866 615      9/1998
EP      1 111 923      6/2001

OTHER PUBLICATIONS

ETSI EN 300 468 V1.4.1 (Nov. 2000) Digital Video Broadcasting (DVB); Specification for Service Information (SI) in DVB Systems. © 2000 European Telecommunications Standards Institute. [83 pages].*

*Primary Examiner*—Kimyen Vu
*Assistant Examiner*—Thomas Gyorfi
(74) *Attorney, Agent, or Firm*—Oblon, Spivak, McClelland, Maier & Neustadt, L.L.P.

(57) ABSTRACT

A method for transmitting entitlement management messages (EMM) controlling access to data and/or services to be provided to plural terminals in a data exchange network. The method, at the transmitting side: defines a set of EMM type messages as a function of at least one criterion representative of a type of data and/or services provided; defines plural types of logical transmission channels and associates at least one parameter to each type of channel to inform terminals of the EMM types transmitting on each described logical channel; assigns at least one channel among the defined logical transmission channels to each EMM message type; transmits the parameter and the logical channels to each terminal; multiplexes the logical transmission channels in the same data stream; and transmits the data stream to terminals. In the method, on reception each terminal filters incoming EMMs as a function of the parameter and at least one state parameter depending on a routine operation of the terminal.

15 Claims, 3 Drawing Sheets

U.S. PATENT DOCUMENTS

| | | | |
|---|---|---|---|
| 5,600,378 A * | 2/1997 | Wasilewski | 348/468 |
| 5,619,501 A * | 4/1997 | Tamer et al. | 370/392 |
| 5,802,063 A * | 9/1998 | Deiss | 370/476 |
| 6,215,530 B1 * | 4/2001 | Wasilewski | 348/731 |
| 6,252,964 B1 * | 6/2001 | Wasilewski et al. | 380/282 |
| 6,671,881 B1 * | 12/2003 | Tamer et al. | 725/31 |
| 6,839,901 B1 * | 1/2005 | De Saint Marc et al. | 725/32 |
| 6,970,127 B2 * | 11/2005 | Rakib | 341/173 |
| 7,039,048 B1 * | 5/2006 | Monta et al. | 370/389 |

\* cited by examiner

METHOD AND DEVICE FOR TRANSMISSION OF ENTITLEMENT MANAGEMENT MESSAGES

TECHNICAL DOMAIN

The domain of the invention is transmissions of scrambled data and/or services to a plurality of terminals connected to a data exchange network and is particularly applicable to a method for transmission of Entitlement Management Messages (EMM) controlling access to these data and to these services and a device designed to implement the method.

STATE OF PRIOR ART

With the development of data exchanges through open networks such as the Internet network, the security of exchanges becomes increasingly important in activities of operators and service providers. This security has several essential purposes:
  to prevent transactions made through the network from being intercepted;
  to assure integrity of data, in other words to determine if the transmitted data has been corrupted during the communication;
  to enable authentication, in other words to assure the identity of the correspondents of a transaction, and confidentiality consisting of making information unintelligible to persons other than persons involved in the transaction.

Authentication is achieved by access control that only enables authorised persons to access resources.

In the encrypted audiovisual programs broadcasting field, the DVB standard defines a Common Scrambling Algorithm (CSA), but does not include anything about access control, leaving operators and service providers free to define their own systems.

However, the DVB standard does include transport of access control data that are retrieved on reception using data descriptors in a Conditional Access Table (CAT) inserted in the MPEG transport multiplex, and by means of other private data packets indicated using data descriptors in a Program Map Table (PMT) that contains Packet Identifier (PID) numbers for each coded program component in the form of an MPEG Packetized Elementary Stream (PES).

In general, information necessary for descrambling is transmitted in specific access control messages called Conditional Access Messages (CAM) that include at least one Entitlement Control Message (ECM) and one Entitlement Management Message (EMM).

These conditional access messages are generated from at least three input data:
  a Control Word (CW) designed to initialise the descrambling sequence;
  a Service Key used to encrypt the control word for a group of one or more users;
  a User Key, used to encrypt the service key.

ECMs depend on the control word and service key, while EMMs depend on the service key and the user key.

ECMs and EMMs are transmitted periodically and continuously to terminals to be sure that users receive them.

On reception, the principle of encryption is to find the service key from the EMMs and the user key contained in a security processor, for example a smart card. The service key is then used to decrypt ECMs in order to find the control word used to initialise the descrambling system.

In known access control systems, EMMs are transmitted in sequence, with no priority or order, independently of the specific functions of each transmitted EMM message. However, the different EMMs do not necessarily concern the same data or the same services, and consequently are not subjected to the same transmitting constraints. EMMs may be distributed in three large families that differ in their functions and in their transmission conditions. For example:
  messages related to the contract between the subscriber and the operator, for example such as a subscription to a service for a determined duration. In this case, EMM messages are permanently transmitted throughout the period of the subscription. This transmission represents a very large data stream, but which must be maintained to assure that data are received by the subscriber;
  so-called dynamic messages that correspond to an immediate need of the subscriber, for example such as a purchase of a session or an event;
  technical management messages for the security processor decided upon by the operator in agreement with the subscriber.

Transmission of these EMM messages in sequence with no priority or order generates a long cycle time, varying from site to site, and causing a long waiting time at the subscriber. Furthermore, the mix of messages with different natures and degrees of urgency causes a non optimised occupation of the pass band.

The purpose of the invention is to overcome the disadvantages described above.

PRESENTATION OF THE INVENTION

The invention proposes a method for transmission of entitlement management messages (EMM) controlling access to data and/or services provided to a plurality of terminals in a data exchange network, characterised in that it comprises the following steps:
  At the transmission side:
  defining a set of EMM type messages as a function of at least one criterion representative of the type of data and/or services provided;
  defining a plurality of types of logical transmission channels and associating at least one parameter (STREAM_TYPE) to each type of channel to inform terminals of the EMM types transiting on each described logical channel;
  assigning at least one channel among the defined logical transmission channels to each EMM message type;
  transmitting the (STREAM_TYPE) parameter and the said logical channels to each terminal;
  multiplexing the logical transmission channels in the same data stream;
  transmitting the said data stream to terminals; and on reception:
  each terminal filters incoming EMMs as a function of the (STREAM_TYPE) parameter and at least one state parameter depending on the routine operation of the terminal.

Preferably, the (STREAM_TYPE) parameter is transmitted to each terminal in a dynamic data structure representing a logical control channel.

According to one preferred embodiment, the dynamic structure is transmitted in an encrypted EMM and comprises at least one of the following fields:
  a first field (EMM_XID) that will enable the terminal to identify the logical channel described by the structure;
  a second field (Version_Number) that will inform the terminal about a change to data and/or a change to the dynamic structure corresponding to transmission of the said new data on the described channel such that the terminal adapts its filtering to retrieve the said new data;

a third field (Listen_time) designed to inform the terminal about a listen time on the described channel.

The said third field (Listen_time) may represent either a minimum fixed duration, or a minimum variable duration, sufficient to enable the terminal to retrieve the transmitted messages.

In one embodiment, the types of defined logical channels comprise at least:

a FAST channel for transmitting EMM messages to terminals that expressly requested these messages;

a DEDICATED channel for transmitting EMM messages with identical functional objectives;

a NORMAL channel designed to transmit EMM messages for which the contents are not predictable and may not be delayed in time;

a DELAYED channel for transmitting non-urgent EMM messages with various functional objectives, to terminals;

a LOAD SHEDDING channel for retransmitting messages that have already been transmitted on a channel other than the DEDICATED channel, to terminals.

Preferably, the minimum variable duration for the FAST, NORMAL, DELAYED and DEDICATED channels is estimated as a function of the repetition rate at which EMM messages are sent.

In one example application of the process according to the invention, the data and/or services provided to terminals represent multimedia programs.

In another example application, the data and/or services provided to terminals represent audiovisual programs.

In both types of applications, EMM messages are encapsulated in MPEG format and are transmitted either in broadcast mode or in connected mode. Apart from the contents of the EMM, the MPEG payload units obtained contain at least the following private information:

EMM_XID representing the identifier of the EMM;

LG_EMM representing the length of the EMM.

The method according to the invention is then used by a device comprising:

means for defining a set of EMM message types as a function of at least one criterion representative of the type of data and/or services provided;

means for defining a set of types of logical transmission channels as a function of the contents to be transported on each channel;

means for assigning a logical transmission channel to each type of EMM message;

means for multiplexing logical transmission channels in the same data stream;

means for transmitting the said data stream to terminals, and means for filtering EMMs incoming into a terminal, as a function of defined channel types.

In the preferred embodiment of the invention, the device comprises:

means for associating at least one parameter (STREAM_TYPE) to each channel type, designed to inform terminals about EMM types transiting on each of the described logical channels;

means for transmitting the (STREAM_TYPE) parameter to each terminal;

means for enabling each terminal to filter incoming EMMs as a function of the (STREAM_TYPE) parameter, and at least one status parameter reflecting routine operation of the terminal.

BRIEF DESCRIPTION OF THE DRAWINGS

Other characteristics and advantages of the invention will become clear from the following description given as a non-limitative example with reference to the attached figures in which.

DETAILED PRESENTATION OF PARTICULAR EMBODIMENTS

Figure 1:
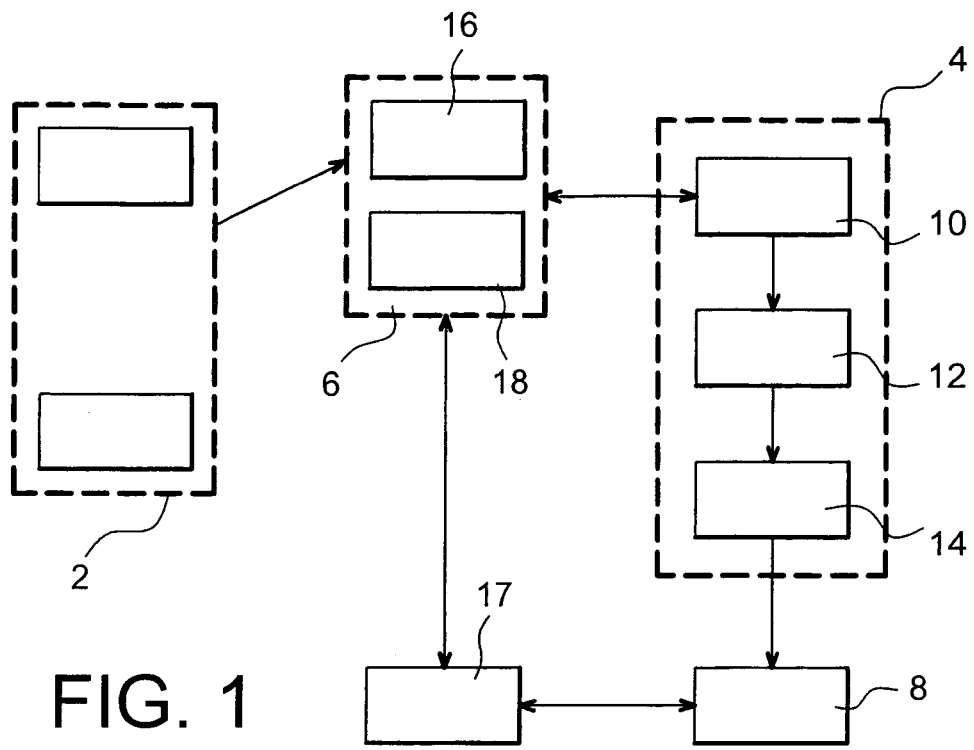
FIG. 1 diagrammatically illustrates a system in which a device for transmission of entitlement management messages (EMM) according to the invention is used.

The following description relates to a particular application of the method according to the invention in a system for distributing audiovisual programs to several subscriber terminals connected to a data exchange network, for example such as the Internet network, or to a private program broadcasting network.

This system enables a first set 2 of subscriber management systems SMS arranged at a commercial operator, for example to communicate through a second set of subscriber entitlement management systems 6, with a third set for transmission of entitlement management messages (EMM) 4.

Each subscriber is provided with a decoder 8 and a security processor in which entitlements are registered.

The third set 4 comprises a first module 10 denoted as B-SAS (Broadcast Subscription Authorisation System) in the remainder of this description, for the organisation and broadcasting of EMMs in accordance with directives output by equipment in the first set 2. The first B-SAS module 10 communicates firstly with equipment in set 6, and secondly with a second multiplexing module MUX 12 connected to a third module 14 broadcasting EMMs to the decoder 8.

The set 6 of equipment for transmission of entitlements to subscribers comprises a first equipment SAS 16 for technical management of security processors and entitlements, and a second STB-MS equipment 18 for management of subscriber terminals.

The function of the first SAS equipment 16 is to express service requests originating from SMSs 2 from different operators as EMM messages that can be processed by the security processor or the terminal and transmit them to the B-SAS module 10 for transmission to subscriber terminals in broadcast mode, or to an I-SAS module 17 to distribute these EMMs in connected mode. The first SAS equipment 16 also enables requests to be made from the B-SAS module 10 for adding, sending and replacement of EMMs to terminals, and requests to delete an EMM send.

The second STB-MS equipment 18 also enables SMS equipment 2 to define and maintain subscriber terminal characteristics.

The second STB-MS equipment 18 also enables requests to be made from the B-SAS module 10 for adding, sending and replacement of EMMs to terminals, and for cancelling sending EMMs. This STB-MS equipment can express service requests originating from SMSs 2 from the different operators as messages that can be processed by the security processor or the terminal and transmit them to the I-SAS module 17 to distribute these EMMs in connected mode.

The decoder 8 located at the subscriber contains the security processor in which subscriber entitlements are recorded, and its function is to process EMM messages contained in the broadcast stream in a known manner, and to manage an MMI (Man-Machine Interface) presented to the subscriber and to dialogue with the subscriber's security processor and with the server of a technical operator.

Figure 2:
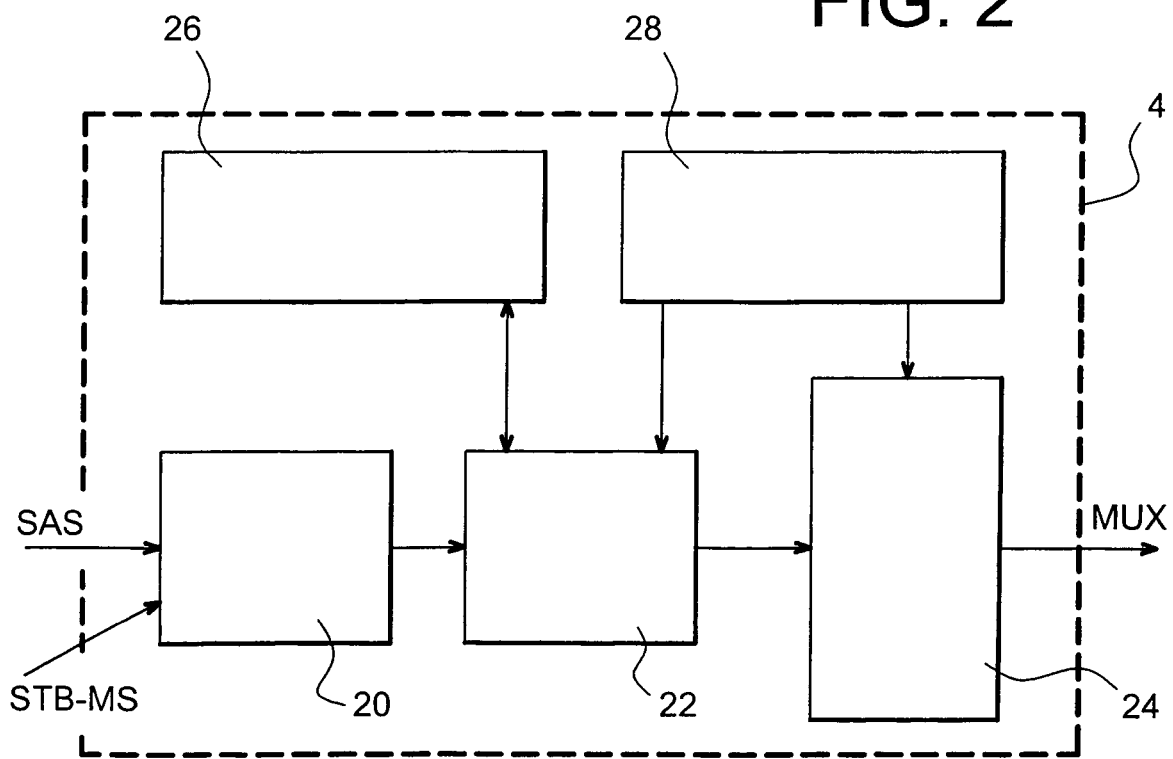
FIG. 2 shows a functional diagram of the device according to the invention.

FIG. 2 shows a detailed functional diagram of the B-SAS module 10. This module comprises a first block 20 intended to collect messages originating from the first SAS equipment 16 or the second STB-MS equipment 18, a second block 22 intended to manage queues, a third block 24 intended to manage broadcasting of EMMs, a fourth block 26 controlled by an administrator intended to define system configuration information, and a fifth supervision block 28 intended to collect technical and application information on the system.

Messages collected by the first block 20 may be requests to add EMMs, to replace or delete EMMs by means of an application protocol such as TCP-IP, CORBA, HTTP+XML, RMI or a proprietary protocol.

Definition of EMM

The device and the process according to the invention are used to define a set of EMM message types as a function of at least one criterion representative of the type of data and/or services provided. To achieve this, the input side SAS equipment 16 and STB equipment 18 request that an EMM should be inserted in a cycle, specifying broadcasting methods (Transmission model reference, EMM broadcast start and end date) and the EMM description (header structure, header size, EMM contents).

Before broadcasting EMMs, a plurality of types of logical transmission channels are defined by a (STREAM_TYPE) parameter that will inform terminals about EMM types transiting on each of the described logical channels. This parameter (STREAM_TYPE) is transmitted to each terminal in the form of a dynamic data structure representing a logical control channel comprising at least one of the following fields:

a first field (EMM_XID) for enabling the terminal to identify the logical channel described by the structure, a second field (Version_Number) for indicating a change in the dynamic structure to the terminal. This change signals to the terminal that new data are transmitted on the described channel such that the terminal can adapt its filtering to retrieve these new data;

a third field (Listen_time) for informing the terminal about a listening time on the described channel.

A logical channel is a sub-part of a stream identified by a PID in the broadcast signal. The definition of such logical channels provides a means of multiplexing them within the same stream in which EMMs transiting on the same channel have the same EMM_XID identifier. Thus on reception, the terminal can filter input EMMs on a stream and only select EMMs from one or several particular channels. To achieve this, the terminal filters input EMMs by setting a mask on the data stream header.

In one particular embodiment, the size of the EMM_XID identifier is 8 bits, so that up to 8 EMM channels can be multiplexed within a stream by assigning one bit per channel.

The B-SAS module 10 has technical characteristics related to the transmission models that it uses to determine the EMM broadcasting channel, to assign at least one channel among the defined logical transmission channels to each type of EMM message. Differences in the broadcast start date and end date are determined for each model. The defined logical channels are multiplexed in a same data stream and are then transmitted to terminals.

Add an EMM

When a request is made to add an EMM, the B-SAS module 10 performs the following processing:
    ### Syntactical analysis of the request,
    ### Check that the transmission model actually exists,
    ### Check that the broadcast dates are consistent,
    ### Check that the EMM identifier is valid,
    ### Update the database,
    ### Switch the EMM to the queue management block 22,
    ### Error management (equipment overload, etc.),
    ### Acknowledge the request.

Replace an EMM

The SAS equipment 16 or the STB-MS equipment 18 on the input side can request that an EMM should be replaced in a cycle by specifying the identifier of the EMM to be replaced. This message may for example be used by the first SAS equipment 16 to enrich the population targeted by an EMM in the context of a registration to a commercial offer.

When a request is made to replace an EMM, the B-SAS module 10 performs the following processing:
    ### Syntactical analysis of the request,
    ### Check that the transmission model actually exists,
    ### Check that the broadcast dates are consistent,
    ### Check that the identifier of the EMM to be replaced is valid,
    ### Check that the identifier of the new EMM is valid,
    ### Update the database,
    ### Switch the EMM to the queue management block 22,
    ### Error management (equipment overload, etc.),
    ### Acknowledge the request.

Delete an EMM

When the request to delete an EMM is received, the B-SAS module 10 performs the following processing:
    ### Syntactical analysis of the request,
    ### Check that the EMM identifier is valid,
    ### Update the database,
    ### Delete broadcast of the EMM on the associated channel,
    ### Error management,
    ### Acknowledge the request.

Note that even if the B-SAS module 10 alone manages deletion of EMMs at the end of the validity period, SAS equipment 16 or STB-MS equipment 18 may explicitly delete a broadcast EMM.

Queue Management

The B-SAS module 10 must be able to satisfy constraints, particularly terminal constraints, and at the same time offer a regular service quality. To achieve this, the second block 22 can:
    ### organise broadcast EMMs so that the terminal can take them into account;
    ### control the speed of EMM channels on a transponder. This speed is usually of the order of 50 to 500 kbits/second;
    ### program broadcasting of some express EMMs in a very short time;
    ### program broadcasting of some EMMs for a sufficiently long time so that they can be processed by all terminals;

switch EMMs that are not urgent to message queues with different characteristics, and organise these queues or logical channels such that the EMM speed is acceptable for a terminal.

Description of Defined Channel Types

In one preferred embodiment of the invention, the types of defined logical channels comprise a FAST channel, a DEDICATED channel, a NORMAL channel, a DELAYED channel and a LOAD SHEDDING channel.

The FAST channel is used in cases in which the terminal is known to be listening to this channel at the time that an EMM concerning it is broadcast. The most frequently used is broadcasting of specific entitlements to an interactive service at the request of the terminal to a service provider. It may also be used when requested by a user. EMMs are repeated on this fast channel a given number of times, with a timeout between each send, and are then eliminated from the broadcast. If the number of messages in the queue is too large, the cycle time of the channel approaches the limiting value of the guaranteed service quality.

The DEDICATED channel transports EMMs for which the characteristics are identical. Two types of EMMs are identified to make up dedicated channels: entitlement renewal EMMs and key change EMMs.

Each dedicated channel is regulated independently of the other channels, either for organisation of the broadcast or to respect the speed allocated to the channel. Only fast channels can interrupt their operation.

The NORMAL channel is necessarily present and is used to send arbitrary EMMs. It transports almost all messages necessary to the subscriber for his permanent use (management of the security processor, private data, etc.).

During operation, the terminal listens to this type of channel during the time specified in the channel description or when subscriber description is changed. This listening may be permanent.

The DELAYED channel is only periodically present in the stream. It is used to send EMMs that are capable of accepting delayed processing such as technical management EMMs for the security or information processor. The terminal will read this channel occasionally when provoked by a change in the channel version number.

The LOAD SHEDDING channel is used to unload other logical channels that have already been broadcast during several cycles and that in many cases have been taken into account by the terminal. EMM broadcast methods are specified in the transmission model. The terminal starts listening to this channel when the terminal is switched on or when the channel version number is changed.

According to one preferred embodiment of the method, a control channel, also called the O channel, transports an encrypted description EMM to terminals, containing a description of the technical characteristics of logical channels sharing the same PID. This description EMM is generated by the B-SAS module 10 as a function of configuration parameters, and the contents to be transported on the channels.

When the description EMM is received, each terminal positions itself on this channel 0 in order to retrieve and analyse the description to determine which logical channels should be listened to, and under what conditions. Each terminal will calculate filtering criteria as a function of the result of the analysis of descriptions.

Broadcast EMMs must satisfy the following constraints:
The EMM broadcast period must be valid.
for an EMM broadcast on a FAST channel, the maximum number of broadcasts must not be reached;
for an EMM transported on other types of channels, the broadcast start date must be between the specified broadcast start date and end date.

Scheduling of sending EMMs enables the terminal to pick up all EMMs in the stream in a minimum number of cycles.

To satisfy this constraint, an algorithm called a random broadcast algorithm organises sending EMMs by putting EMMs to be sent in a broadcast cycle, into a random sequence.

The timeout between two EMMs transported on the control channel (channel o) must be at least 100 ms.

Management of EMM Broadcasts

In the example embodiment described, the definition of broadcasting resources and management of EMM broadcasts comply with the EMMG/PDG protocol, part of the ETSI standard TS 103 197 "Head-End implementation of DVB simulcrypt". This protocol includes use of the "channel" and "streams" as they are denoted in the remainder of this description, to dialogue with the MUX multiplexing module 12.

Management of "Channels" and "Streams"

Figure 3:
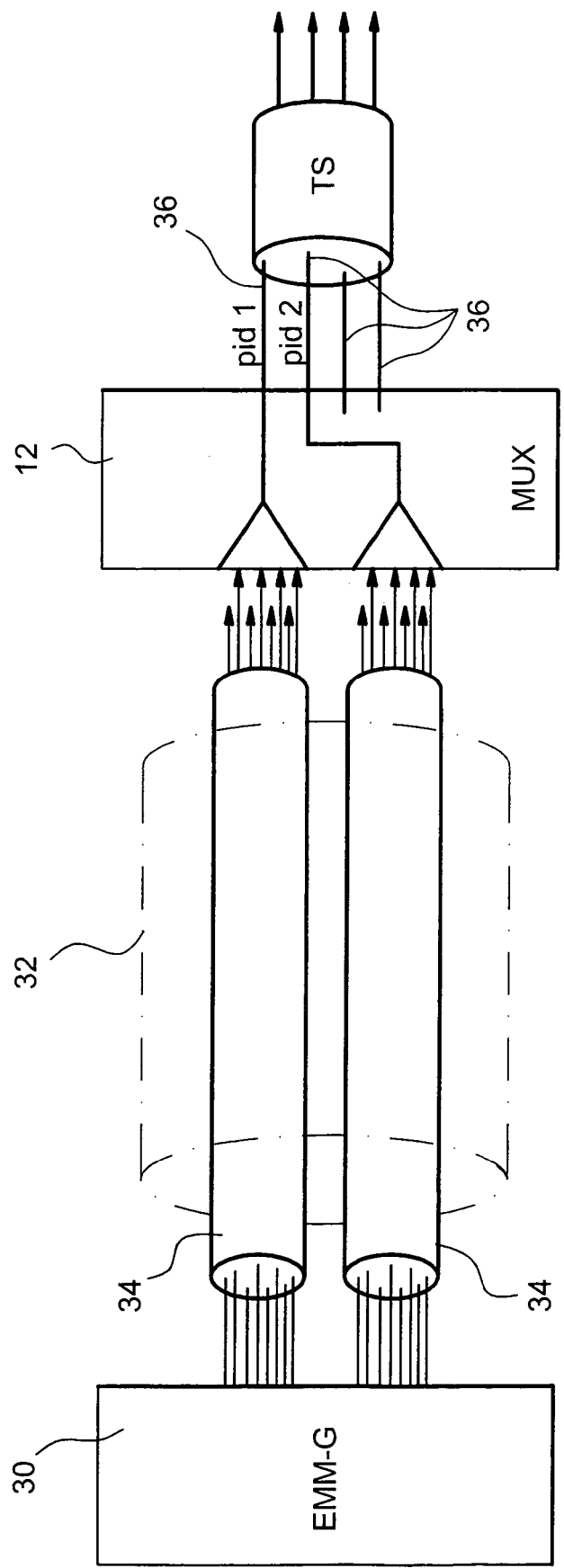
FIG. 3 diagrammatically shows a method of communication between an EMM message generator and a multiplexer according to a preferred embodiment of the invention.

As shown diagrammatically in FIG. 3, communication between an EMM message generator 30 and a MUX module 12 is carried out through a super-channel 34 identified by a client_id identifier identifying the conditional access system and that can be personalised by the operator.

The B-SAS module 4 sets up one "channel" 32 per operator or per group of operators, that enables the creation of one or several streams 34 identified by a stream_id (Stream_id 1, Stream_id 2, etc.) that are unique within the channel. A stream 34 is composed of a control channel and a data channel on which EMMs transit in MPEG2 TS packets. The data channel may make use of TCP/IP protocols or UDP/IP in broadcast mode.

Each stream 34 corresponds to creation of a transponder component 36 identified by a Packet IDentifier PID at the output from MUX module 12.

According to one variant embodiment, by default, the B-SAS module 4 only creates one stream 34. A second stream 34 will be created if the number of channels for the operator exceeds 8 (maximum number of channels multiplexed on the same EMM stream). The pass band is negotiated between the EMM generator 30 and the MUX multiplexing module 12 at the initiative of the generator 30 for each stream 34.

Management of Sending EMMs

EMMs are prepared for broadcasting to the multiplexer 12 in two steps. The first step consists of encapsulating EMMs in an MPEG2 payload unit, the second step consists of building up MPEG2 TS transport packets to be sent to the MUX(s) 12.

Encapsulation in MPEG2 Payload Unit

MPEG payload units obtained by encapsulation comprise at least the following private information:
EMM_XID representing the EMM identifier;
LG_EMM representing the length of the EMM, and
the contents of the EMM.

The encapsulation rules are as follows:
One and only one EMM per payload unit,
One or several chained payload units per EMM.

The B-SAS module 10 makes up MPEG TS packets with a fixed size (188 bytes, including the header). Therefore the MPEG2 payload units are located within the packet or overlap on two or more than two packets.

Figure 4:
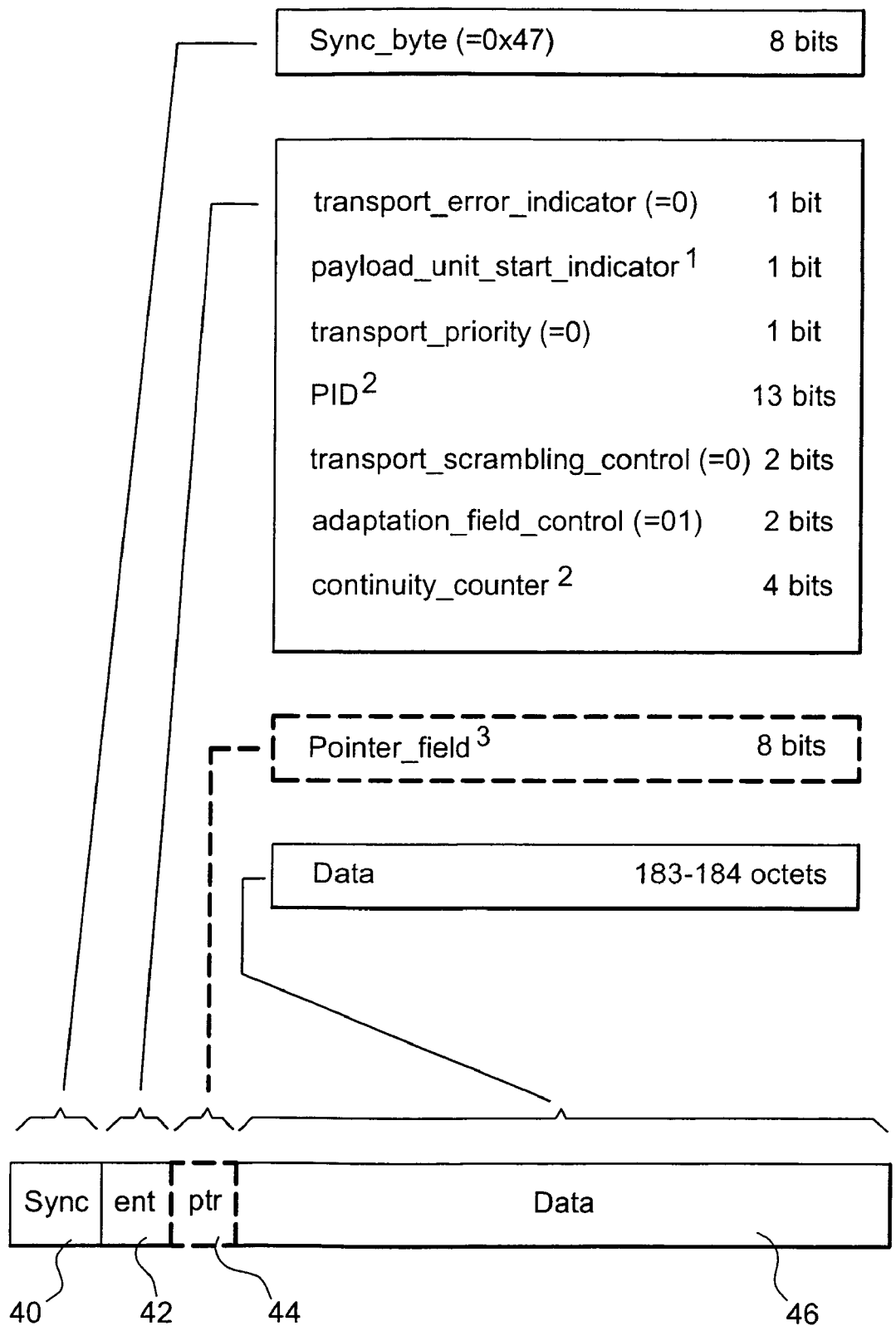
FIG. 4 diagrammatically illustrates EMM encapsulation in an MPEG payload unit according to one example embodiment of the invention.

A TS packet respects the format diagrammatically shown in FIG. 4 in accordance with the ISO/IEC 13818-1 standard "Generic coding of moving pictures and associated audio information: Systems". This packet comprises a first Sync synchronisation field 40 comprising eight bits, a header (ent) 42, a pointer "ptr" 44 and a block 46 containing useful data (DATA).

The header 42 comprises:
- a transport error indicator bit (transport_error-indicator);
- a payload start indicator bit in the packet (payload_unit-_start_indicator);
- a transport priority indicator bit (transport priority);
- a block of thirteen bits representing the packet identifier PID;
- two scrambling control bits;
- two adaptation field control bits;
- two continuity index bits.

The payload_unit_start_indicator bit indicates if a payload unit starts in the packet. If it does, this bit is equal to 1 and the "ptr" field is defined and it contains the rank of the beginning of the payload unit in the useful data 46.

If not, the payload unit_start_indicator bit is equal to 0 and the "ptr" field does not exist. This is the case of one payload unit out of more than 2 packets or a partially filled packet.

Exchanges Between the B-SAS Module 10 and Other Equipment

The needs of the different players acting on the equipment are expressed to the BSAS module 10 through a trigger event that may be a message transiting on interfaces of the sender/BSAS equipment, or for example requests originating from an operator.

Needs of the First SAS Equipment 16

Sending an EMM

The first SAS equipment 16 sends EMM messages to be broadcast to a decoder 8, to the B-SAS module 10. This communication is made through a request in which the first SAS equipment 16 specifies methods of broadcasting the EMM, and particularly the transmission model to be used and the transmission start and end dates. The B-SAS module 10 builds up and organises sending EMMs on the logical channels specified by the transmission model, and as a function of the broadcast dates on which time offsets can be applied.

Replace an EMM

The SAS equipment 16 may need to optimise broadcasting of EMMs to the B-SAS module 10. In this case, the first SAS equipment 16 replaces one EMM in broadcasting, by another EMM specifying a more complete population. The first SAS equipment 16 requests the B-SAS module 10 to replace one EMM by another in the broadcast.

Cancel Sending an EMM

The fist SAS equipment 16 may also request the B-SAS 10 to immediately cancel an EMM, in the routine broadcast.

Needs of the Second STB-MS Equipment 18

The STB-MS manages the set of terminals belonging to one or several operators. Consequently, this equipment may request the B-SAS 10 to send or replace EMMs addressed to terminals, or to cancel sending EMMs.

Send an EMM

EMMs addressed to the terminal are provided to the B-SAS module 10 through an STB-MS/BSAS interface message. This message and the associated processing are identical to those used for the first SAS equipment 16.

Replace an EMM

The STB-MS equipment 18, like the first SAS equipment 16, may need to optimise broadcasting of its EMMs and consequently use the same command as the first SAS equipment 16. The STB-MS equipment 18 also enables SMS equipment 2 to define and maintain the characteristics of subscriber terminals.

Cancel Sending an EMM

Similarly, the second STB-MS equipment 18 may request the B-SAS module 10 to cancel an EMM in the routine broadcast.

Needs of the DECODER

The terminal receives EMM streams sent by the different B-SAS modules 10. These EMMs are provided by the different items of equipment connected to the B-SAS module 10, namely the SAS(s) 16 and the STB-MS(s) 18 and are sent either to the security processor, to one or several security processors or one or several terminals.

Reception of the Logical Channel Description

The terminal must be able to extract management messages concerning it from the signal. To achieve this function, the B-SAS module 10 communicates the description and methods of broadcasting the different logical channels making up the stream, on the control channel.

Reception of EMMs Sent by the B-SAS Module 10

The terminal must be able to extract all management messages concerning it from a logical channel, and if necessary reconstruct them in the case of EMMs chained on several payload units. Moreover, some terminal components such as demultiplexers, impose broadcasting constraints particularly on the number of EMMs broadcast for a single security processor within defined time periods.

The B-SAS module 10 takes account of these constraints by applying a random EMM broadcasting algorithm, respecting MPEG constraints for breakdown into payload units.

The invention claimed is:

1. A method for transmitting entitlement management messages (EMM) controlling access to data and/or services to be provided to a plurality of terminals in a data exchange network, the method comprising:
   at transmission:
   defining a set of EMM type messages as a function of at least one criterion representative of a type of data and/or services provided,
   defining a plurality of types of logical transmission channels and associating at least one parameter to each type of channel to inform terminals of the EMM types transmitted on each described logical channel,
   assigning at least one channel among the defined logical transmission channels to each EMM message type,
   transmitting the parameter and the logical channels to each terminal,
   multiplexing the logical transmission channels in a unique data stream, and
   transmitting the data stream to terminals; and
   at reception:
   each terminal filtering incoming EMMs as a function of the parameter and at least one state parameter depending on a routine operation of the terminal, wherein, the parameter is transmitted to each terminal in a dynamic data structure representing a logical control channel, comprising at least one of the following fields:
   a first field configured to enable the terminal to identify the logical channel descried by the structure,
   a second field configured to inform the terminal about a change to data and/or change to the dynamic structure corresponding to transmission of new data on the described channel such that the terminal adapts its filtering to retrieve the new data, and a third field configured to inform the terminal about a listen time on the described channel, wherein the types of defined logical channels comprise at least:

a FAST channel configured to transmit EMM messages to terminals that expressly requested these messages;

a DEDICATED channel configured to transmit EMM messages with identical functional objectives;

a NORMAL channel configured to transmit EMM messages for which contents are not predictable and may not be delayed in time;

a DELAYED channel configured to transmit to terminals non-urgent EMM messages with plural functional objectives; and a LOAD SHEDDING channel configured to retransmit messages that have already been transmitted on a channel other than the DEDICATED channel, to terminals.

2. A method according to claim 1, wherein the dynamic data structure is transmitted in an encrypted EMM.

3. A method according to claim 2, wherein the third field represents a minimum fixed duration sufficiently long to enable the terminal to retrieve the transmitted messages.

4. A method according to claim 2, wherein the third field represents a minimum variable duration, as a function of a repetition rate at which EMM messages are sent.

5. A method according to claim 4, wherein the minimum variable duration for the FAST, NORMAL, DELAYED, and DEDICATED channels is estimated as a function of the repetition rate at which EMM messages are sent.

6. A method according to claim 1, wherein the data and/or services provided to terminals represent multimedia programs.

7. A method according to claim 6, wherein the data and/or services provided to terminals represent audiovisual programs.

8. A method according to claim 1, wherein the EMM messages are transmitted in broadcast mode.

9. A method according to claim 1, wherein the EMM messages are transmitted in connected mode.

10. A method according to claim 8, wherein the EMM messages are encapsulated in MPEG format.

11. A method according to claim 9, wherein the EMM messages are encapsulated in MPEG format.

12. A method according to claim 10, wherein the MPEG payload units obtained contain at least private information including:

EMM_XID representing an identifier of the EMM;
LG_EMM representing a length of the EMM; and
contents of the EMM.

13. A method according to claim 11, wherein the MPEG payload units obtained contain at least private information including:

EMM_XID representing an identifier of the EMM;
LG_EMM representing a length of the EMM; and
contents of the EMM.

14. A device for transmitting entitlement management messages controlling access to data and/or services to be provided to a plurality of terminals in a data exchange network, comprising:

means for defining a set of EMM type messages as a function of at least one criterion representative of the type of data and/or services provided:

means for defining plural types of logical transmission channels as a function of contents to be transmitted on each channel;

means for assigning a logical transmission channel to each EMM message type;

means for multiplexing the logical transmission channels in a same data stream;

means for transmitting the data stream to terminals; and means for filtering incoming EMMs into a terminal, as a function of defined channel types, wherein the parameter is transmitted to each terminal in a dynamic data structure representing a logical control channel, comprising at least one of the following fields:

a first field configured to enable the terminal to identify the logical channel described by the structure, a second field configured to inform the terminal about a change to data and/or change to the dynamic structure corresponding to a transmission of new data on the described channel such that the terminal adapts its filtering to retrieve the new data, and a third field configured to inform the terminal about a listen time on the described channel, wherein said types of defined logical channels comprise at least:

a FAST channel configured to transmit EMM messages to terminals that expressly requested these messages;

a DEDICATED channel configured to transmit EMM messages with identical functional objectives;

a NORMAL channel configured to transmit EMM messages for which contents are not predictable and may not be delayed in time;

a DELAYED channel configured to transmit to terminals non-urgent EMM messages with plural functional objectives; and a LOAD SHEDDING channel configured to retransmit messages that have already been transmitted on a channel other than the DEDICATED channel, to terminals.

15. A device according to claim 14, further comprising:

means for associating at least one parameter to each channel type, to inform terminals about EMM types transmitting on each of the described logical channels;

means for transmitting the parameter to each terminal; and means for enabling each terminal to filter incoming EMMs as a function of the parameter, and at least one status parameter reflecting a routine operation of the terminal.

* * * * *